(12) United States Patent
Wong

(10) Patent No.: US 9,585,012 B2
(45) Date of Patent: Feb. 28, 2017

(54) SYSTEM AND METHOD FOR ESTABLISHING A SECURE CONNECTION IN COMMUNICATIONS SYSTEMS

(75) Inventor: Marcus Wong, Green Brook, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 794 days.

(21) Appl. No.: 13/471,207

(22) Filed: May 14, 2012

(65) Prior Publication Data

US 2013/0301833 A1    Nov. 14, 2013

(51) Int. Cl.
| | | |
|---|---|---|
| *H04W 12/04* | (2009.01) | |
| *H04W 12/06* | (2009.01) | |
| *H04W 84/12* | (2009.01) | |
| *H04W 12/10* | (2009.01) | |

(52) U.S. Cl.
CPC ............ *H04W 12/04* (2013.01); *H04W 12/06* (2013.01); *H04W 84/12* (2013.01); *H04W 12/10* (2013.01)

(58) Field of Classification Search
CPC ... H04L 2209/80; H04W 12/04; H04W 12/06; H04W 12/10; H04W 84/12
See application file for complete search history.

(56) References Cited

U.S. PATENT DOCUMENTS

| | | | | |
|---|---|---|---|---|
| 7,519,824 B1* | 4/2009 | Peyravian | ............. | H04L 9/3297 380/255 |
| 7,885,639 B1* | 2/2011 | Satish et al. | .................. | 455/410 |
| 8,397,063 B2* | 3/2013 | DiCrescenzo | ................ | 713/158 |
| 2004/0006705 A1* | 1/2004 | Walker | ........................... | 713/200 |
| 2004/0098588 A1* | 5/2004 | Ohba et al. | .................... | 713/169 |
| 2005/0032506 A1* | 2/2005 | Walker | ........................... | 455/411 |
| 2006/0135066 A1* | 6/2006 | Banerjea | ...................... | 455/41.2 |
| 2007/0189528 A1* | 8/2007 | Ueda | ........................... | 380/44 |
| 2007/0197190 A1* | 8/2007 | Tang | .................... | H04W 12/04 455/410 |
| 2008/0065884 A1* | 3/2008 | Emeott et al. | ................ | 713/168 |
| 2008/0072047 A1* | 3/2008 | Sarikaya et al. | .............. | 713/171 |
| 2008/0184276 A1* | 7/2008 | Jong | ................... | H04L 63/0428 719/321 |
| 2010/0265885 A1* | 10/2010 | Umeuchi et al. | ............. | 370/328 |
| 2010/0303051 A1* | 12/2010 | Umeuchi et al. | ............. | 370/338 |

(Continued)

FOREIGN PATENT DOCUMENTS

| | | |
|---|---|---|
| CN | 101272241 A | 9/2008 |
| WO | WO 2011-005644 A2 | 1/2011 |

OTHER PUBLICATIONS

Chamas, "Securing Open Access Networks Using Intelligent Policy Management System", IEEE, 2008, pp. 663-667.*

(Continued)

*Primary Examiner* — Bradley Holder
*Assistant Examiner* — Walter Malinowski
(74) *Attorney, Agent, or Firm* — Slater Matsil, LLP

(57) ABSTRACT

A method for establishing a secure connection between a station and an access point includes transmitting a communications system management message to the station, the communications system management message including an access point nonce. The method also includes receiving a station nonce from the station, and determining a first security key according to the access point nonce and the station nonce. The method further includes securing a connection between the station and the access point using the first security key.

24 Claims, 12 Drawing Sheets

(56) References Cited

U.S. PATENT DOCUMENTS

2011/0208968 A1* 8/2011 Inada ............................ 713/171
2012/0327898 A1* 12/2012 Lu ................................ 370/331

OTHER PUBLICATIONS

Bharghavan, "Secure Wireless LANs", CCS'94 Proceedings of the 2nd ACM Conference on Computer and Communications Security, 1994, pp. 10-17.*
"Part 11: Wireless LAN Medium Access Control (MAC) and Physical Layer (PHY) Specifications," IEEE Standards Association, IEEE Std 802.11, 2012, 2,793 pages.
Cherian, G., et al., "Fast Authentication in TGai," IEEE 802.11, Nov. 2011, 32 pages.
Sun, R., et al., "TGai FILS Authentication Protocol," IEEE 802.11, Jan. 2012, 18 pages.
IEEE Standard for Information technology—Telecommunications and information exchange between systems—Local and metropolitan area networks—Specific Requirements, Part 11: Wireless LAN Medium Access Control (MAC) and Physical Layer (PHY) Specifications, IEEE Std 802.11™-2007 (Revison of IEEE Std 802.11-1999), IEEE Computer Society LAN/MAN Standards Committee, Jun. 12, 2007, 1,233 pages.
Sun, R., et al, "TGai FILS Authentication Protocol," doc.: IEEE 802.11-12/0039r3, Nov. 15, 2011, 18 pages.
Cherian, G., et al., "Fast Authentication in TGai," doc.: IEEE 802.11-11/1160r6, Jan. 16, 2012, 32 pages.
International Search Report and Written Opinion of Patent Cooperation Treaty (PCT), International Application No. PCT/CN2012/076130, Applicant Huawei Technologies Co., Ltd., et al., date of mailing Feb. 28, 2013, 15 pages.

* cited by examiner

SYSTEM AND METHOD FOR ESTABLISHING A SECURE CONNECTION IN COMMUNICATIONS SYSTEMS

TECHNICAL FIELD

The present disclosure relates generally to digital communications, and more particularly to a system and method for establishing a secure connection in communications systems.

BACKGROUND

Wireless communications systems have enabled users the freedom to move around with the coverage area of the wireless communications system and retain access to services to which they are subscribed. As the user moves, it may be necessary for the user to break an existing connection with an existing communications controller and establish a new connection with a new communications controller. Users may also be commonly referred to as stations, mobile devices, terminals, subscribers, wireless nodes, mobiles, and the like, while communications controllers may also be referred to as access points, base stations, controllers, and the like.

Generally, the establishment of a new connection requires an exchange of a number of messages between the user and the communications controller (and potentially other entities in the communications system). The exchange of the messages may incur a significant delay as a result of, for example, traversing several nodes before reaching the intended entities, which may interrupt service for the user. Furthermore, establishing a secure connection typically involves the exchange of additional messages that are used to perform authentication and session key agreement and to secure the connection, which may further delay the establishment of the connection. Therefore, there is a desire to speed up the establishment of the new connection and reduce interruption to the service of the user.

SUMMARY OF THE DISCLOSURE

Example embodiments of the present disclosure which provide a system and method for establishing a secure connection in communications systems.

In accordance with an example embodiment of the present disclosure, a method for establishing a secure connection between a station and an access point is provided. The method includes transmitting, by the access point, a communications system management message to the station, the communications system management message including an access point nonce, and receiving, by the access point, a station nonce from the station. The method also includes determining, by the access point, a first security key according to the access point nonce and the station nonce, and securing, by the access point, a connection between the station and the access point using the first security key.

In accordance with another example embodiment of the present disclosure, a method for establishing a secure connection between a station and an access point is provided. The method receiving, by the station, a communications system management message from the access point, the communications system management message including an access point nonce, and determining, by the station, a first security key according to the access point nonce and a station nonce. The method also includes transmitting, by the station, the station nonce to the access point, and securing, by the station, a connection between the station and the access point using the first security key.

In accordance with another example embodiment of the present disclosure, an access point is provided. The access point includes a transmitter, a receiver, and a processor operatively coupled to the transmitter and to the receiver. The transmitter transmits a communications system management message to a station, the communications system management message including an access point nonce. The receiver receives a station nonce from the station. The processor determines a first security key according to the access point nonce and the station nonce, and secures a connection between the station and the access point using the first security key.

In accordance with another example embodiment of the present disclosure, a station is provided. The station includes a receiver, a transmitter, and a processor operatively coupled to the receiver and to the transmitter. The receiver receives a communications system management message from an access point, the communications system management message including an access point nonce. The transmitter transmits a station nonce to the access point. The processor determines a first security key according to the access point nonce and the station nonce, and secures a connection between the station and the access point using the first security key.

One advantage of an embodiment is that a number of messages exchanged in the establishment of a connection is reduced. Hence, the establishment of the new connection may proceed at a faster rate, thereby reducing the interruption of service to the user.

Yet another advantage of an embodiment is that the replay of the nonce exchange is prevented where a previously used nonce may be used again, thereby enhancing the security of the keys generated.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to establishing a secure connection in a communications system. For example, an access point transmits a communications system management message including an access point nonce to a station. The access point receives a station nonce and uses the station nonce along with the access point nonce to determine a security key, which is used to secure a connection between the station and the access point. For example, a station receives a communications system management message including an access point nonce from an access point. The station transmits a station nonce to the access point and uses the station nonce along with the access point nonce to determine a security key. The security key is used to secure a connection between the access point and the station.

The present disclosure will be described with respect to example embodiments in a specific context, namely an IEEE 802.11 compliant communications system that makes use of nonces to establish a secure connection between a station and an access point. The disclosure may also be applied, however, to other communications systems that utilize a handshake procedure with nonces to establish a secure connection for a user and a communications controller.

Figure 1:
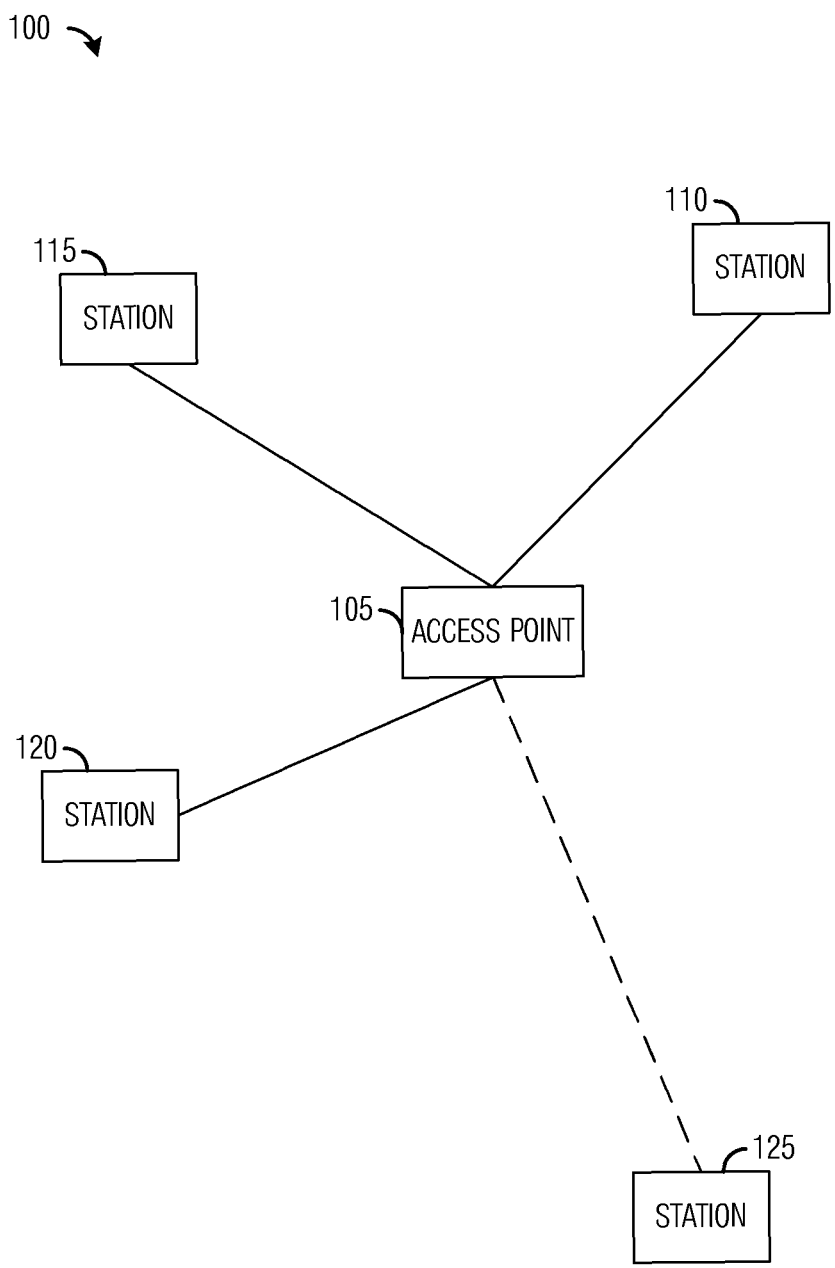
FIG. 1 illustrates an example communications system according to example embodiments described herein.

FIG. 1 illustrates a communications system 100. Communications system 100 may be representative of an IEEE 802.11 compliant communications system, i.e., a Wi-Fi communications system. However, communications system 100 may be illustrative of other communications systems, wherein communications between devices are controlled by a communications controller. These types of communications systems are commonly referred to as cellular communications systems.

Communications system 100 includes an access point 105. Access point 105 controls communications between stations served by access point 105, such as station 110, station 115, and station 120. As an example, station 110 may communicate with a service provider by sending a transmission to access point 105 as well as receiving a transmission from access point 105. Similarly, station 115 may communicate with station 120 by sending a transmission to access point 105 as well as receiving a transmission from access point 105, which sends the transmission to station 120 and receives the transmission from station 120. As discussed previously, an access point may also be referred to as a communications controller, a base station, a controller, and the like, while a station may also be referred to as a user, a mobile device, a terminal, a subscriber, a wireless node, a mobile, and the like.

While it is understood that communications systems may employ multiple access points capable of communicating with a number of stations, only one access point, and four stations are illustrated for simplicity.

Access point 105 may allow a station 125 to connect to and obtain resources from access point 105 after station 125 completes a connection establishment procedure. As an example, station 125 may connect to access point 105 when a user initially powers station 125 within a coverage area of access point 105. As an alternative example, a user who is accessing a service with station 125 moves into the coverage area of access point 105 and station 125 needs to establish a connection with access point 105 to permit the user continued access to the service.

The connection between access point 105 and station 125 may be an unsecured connection or a secured connection. The establishment of an unsecured connection or a secured connection may be similar, with the establishment of a secured connection potentially requiring a few additional steps.

Figure 2:
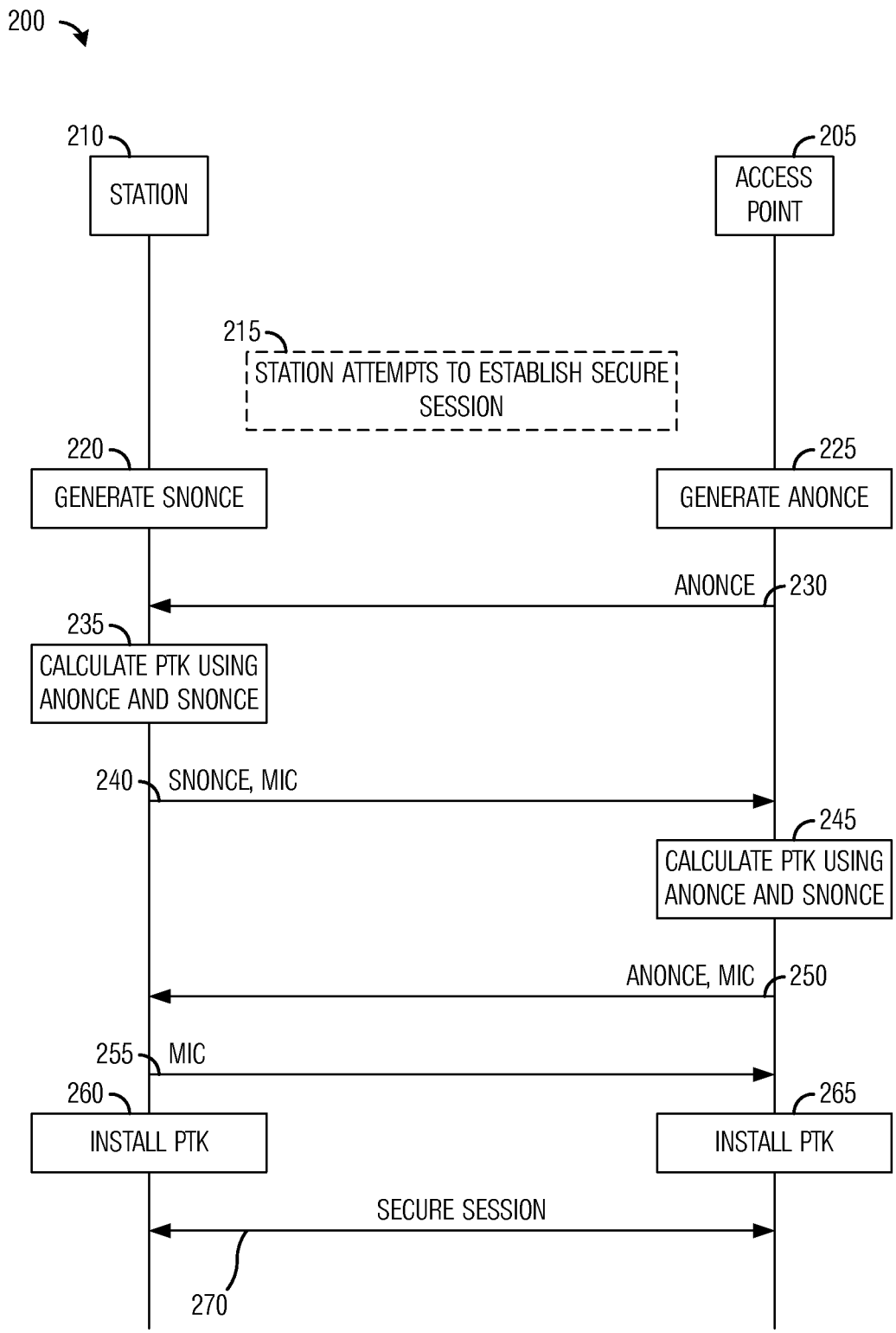
FIG. 2 illustrates an example message exchange diagram between two devices as the two devices establish a secure connection according to example embodiments described herein.

FIG. 2 illustrates a message exchange diagram 200 between two devices as the two devices establish a secure connection. Message exchange diagram 200 may involve messages exchanged between two devices, an access point 205 and a station 210, as access point 205 and station 210 establish a secure connection.

Message exchange diagram 200 may begin with station 210 attempting to establish a secure session with access point 205 (shown as block 215). Establishment of the secure session may include station 210 and access point 205 exchanging messages to authenticate station 210. It is noted that authentication of station 210 may also involve messages exchanged with other network entities, for example, an Authentication, Authorization and Accounting (AAA) server. Establishing the secure session may also include an establishment of a connection between station 210 and access point 205. As an example, the messages exchanged in establishing the connection may include a connection request message sent by station 210 to access point 205, and a connection request response message sent by access point 205 to station 210.

With the connection established, station 210 and access point 205 may secure the connection. Station 210 may generate a station nonce ("SNONCE") (shown as block 220) and access point 205 may generate an access point nonce, ("ANONCE") (shown as block 225). As an example, a nonce may be a unique value that is used to as one of the inputs into a pseudo random function for generating cryptographic session keys. The generated session keys may be used for example to digitally sign a cryptographic communication or to encrypt a communication session between the station and an access point. As an example, a nonce may be a unique and non-repeating numerical value. Unique nonces may be used to help prevent replay attacks wherein a hacker may use a previously used nonce value to trick a system in generating a previously used key in an attempt to obtain access to secured information.

Access point 205 may transmit its ANONCE to station 210 (shown as event 230). Station 205 may use its SNONCE and the ANONCE from access point 205 to generate a security key, such as a pairwise transient key (PTK) (shown as block 235). As an example, the security key, e.g., the PTK, may be used by station 210 and access point 205 to secure the connection. Station 210 may transmit its SNONCE and an integrity code, such as a message integrity code (MIC), to access point 205 (shown as event 240). As an example, the integrity code may be used by access point 205 to verify that the SNONCE is indeed transmitted by station 210.

Access point 205 may use its ANONCE and the SNONCE from station 210 to generate a security key, such as a PTK (shown as block 245). Access point 205 may send its ANONCE and an integrity code, such as a MIC, to station 210 (shown as even 250). It is noted that the integrity code sent by access point 205 may be different from the integrity code sent by station 210. As with the integrity code sent by station 210, the integrity code sent by access point 205 may be used to verify that the ANONCE is indeed transmitted by access point 205. Station 210 may transmit its integrity code to access point 205 to confirm that it successfully received the ANONCE and the integrity code from access point 205 (shown as event 255). It is noted that events 250 and 255 may be considered to be security information, for example session keys, confirmation operations.

Both access point 205 and station 210 may then install the security keys, such as the PTKs, to secure the connection previously established (shown as blocks 260 and 265) and subsequent communications. Access point 205 and station 210 may now have a secure connection and may start the secure session (shown as event 270).

As discussed previously, a nonce may be a unique value used as one of the inputs into a pseudo random function for generating cryptographic session keys. The generated session keys then may be used, for example, to digitally sign a cryptographic communication or to encrypt a communication session between a station and an access point. Hence, a wide range of unique values may be used as nonces. It is noted that even non-unique values may be used as nonces, however, the use of non-unique values can weaken the strength of the keys, the security of the information, and the like.

It is noted that communications system management messages, such as beacons, probe responses, and the like, include timestamps. Communications system management messages may also be commonly referred as system messages, management messages, control messages, signaling messages, management frames, and the like. In general, timestamps are unique values within the precision represented by the size (e.g., number of bits) of the timestamp, the larger the size of the stamp may be equivalent to a more precise the representation of the timestamp. As an example, the timestamps of beacons in a Wi-Fi compliant communications system are 64-bit values, which may represent the number of microseconds that have elapsed since a reference time, for example, Jan. 1, 1970. As the timestamp represents the current system time, it is considered unique. The timestamps of communications system management messages may then be used as nonces. As another example, a monotonically increasing sequence of numbers may also be used as nonces, such as packet numbers, frame numbers, and the like. As yet another example, random numbers may be used as nonces.

Figure 3A:
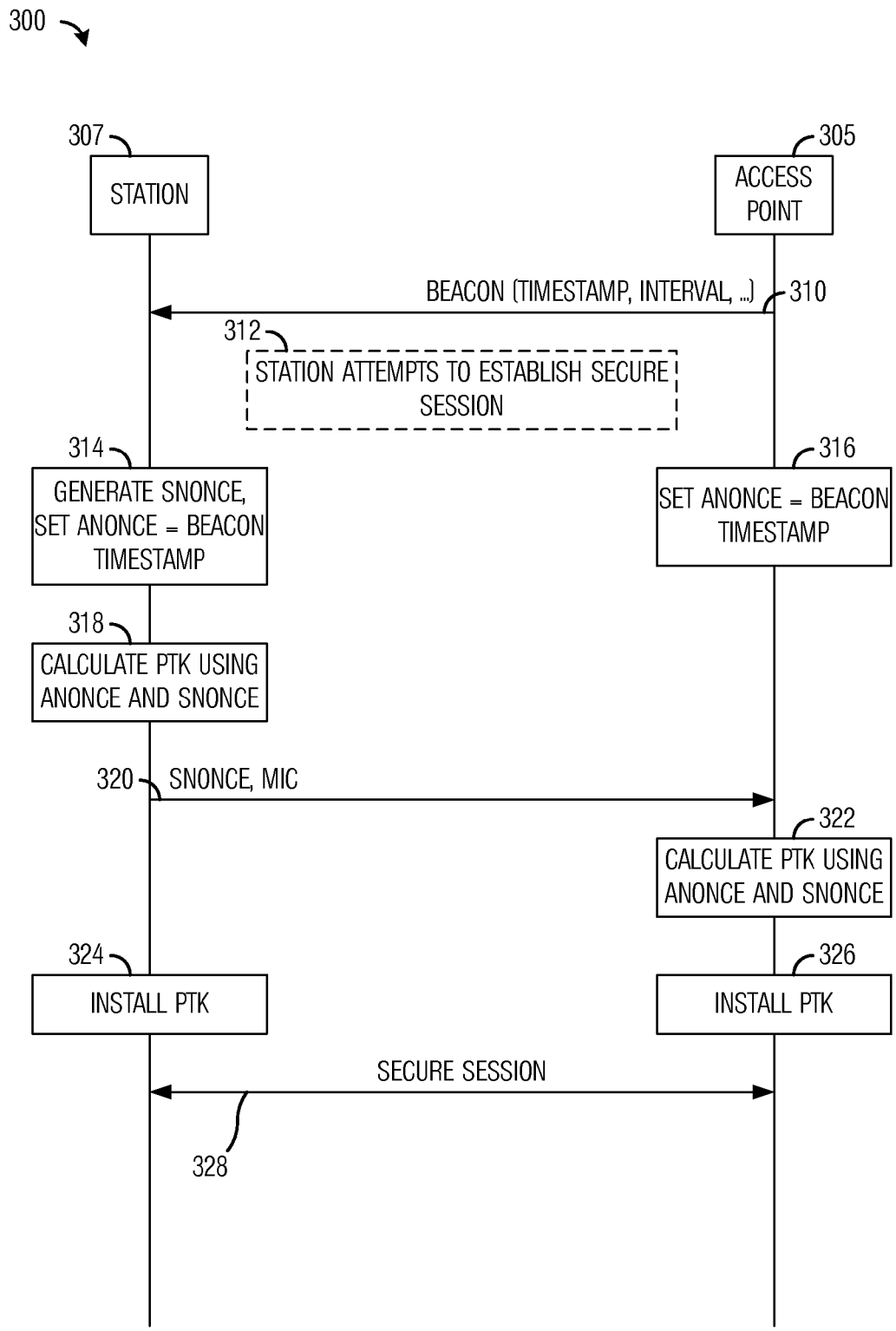
FIG. 3a illustrates a first example message exchange diagram between two devices as the two devices establish a secure connection where a unique value of a system management message is used as a nonce according to example embodiments described herein.

FIG. 3a illustrates a message exchange diagram 300 between two devices as the two devices establish a secure connection where a unique value of a system management message is used as a nonce. Message exchange diagram 300 may involve messages exchanged between two devices, an access point 305 and a station 307, as access point 305 and station 307 establish a secure connection where a unique value of a system management message, e.g., a beacon, is used as a nonce.

Message exchange diagram 300 may begin with access point 305 transmitting a beacon (shown as event 310). As an example, in a Wi-Fi communications system, a beacon is transmitted by an access point, such as access point 305, with a period of approximately 100 milliseconds. A Wi-Fi beacon generally includes a timestamp that indicates when the access point transmitted the beacon, as well as an interval, which may specify when the next beacon will be transmitted. It is noted that the timestamp may be an automatically generated unique value and may be used as a nonce, such as an ANONCE.

Station 307 may attempt to establish a secure session with access point 305 (shown as block 312). As an example, the messages exchanged in establishing the secure session may include messages involved in authenticating station 307. As another example, the messages exchanged in establishing the secure session may include a connection request message sent by station 307 to access point 305, and a connection request response message sent by access point 305 to station 307.

As described previously, the timestamp of the beacon is a unique value, therefore, the timestamp of the beacon may be used as a nonce, such as the ANONCE. Station 307 may generate a SNONCE and use the timestamp of the beacon as an ANONCE (shown as block 314). Similarly, access point 305 may use the timestamp of the beacon as the ANONCE (shown as block 316). Station 307 may use the ANONCE (from the timestamp of the beacon) and its own SNONCE to generate a security key, such as a PTK (shown as block 318). It is noted that station 307 may use the entirety of the timestamp as the ANONCE. However, it may be possible for station 307 to use a portion of the timestamp as the ANONCE. As an example, station 307 may use the N least significant bits of the timestamp, where N is a positive integer value. Additionally, the timestamp may be applied to a mathematical function before being used as the ANONCE. Examples of mathematical functions may include logarithms, roots, exponentials, linear functions, non-linear functions, and the like.

Station 307 may transmit its SNONCE and an integrity code, such as a MIC, to access point 305 (shown as event 320). As an example, the integrity code may be used by access point 305 to verify that the SNONCE is indeed transmitted by station 307.

Access point 305 may use its ANONCE and the SNONCE from station 307 to generate a security key, such as a PTK (shown as block 322). Both access point 305 and station 307 may then install the security keys, such as the PTKs, to secure the connection previously established (shown as blocks 324 and 326). Access point 305 and station 307 may now have a secure connection and may start the secure session (shown as event 328).

It is noted that the use of the timestamp of the beacon as the ANONCE may help to eliminate a need of access point 305 from transmitting the ANONCE to station 307. As shown in FIG. 3a, in a secure connection establishment process that does not include security information confirmation operations, the number of transmissions used in establishing the secure connection establishment process may be reduced from two transmissions down to one transmission.

Figure 3B:
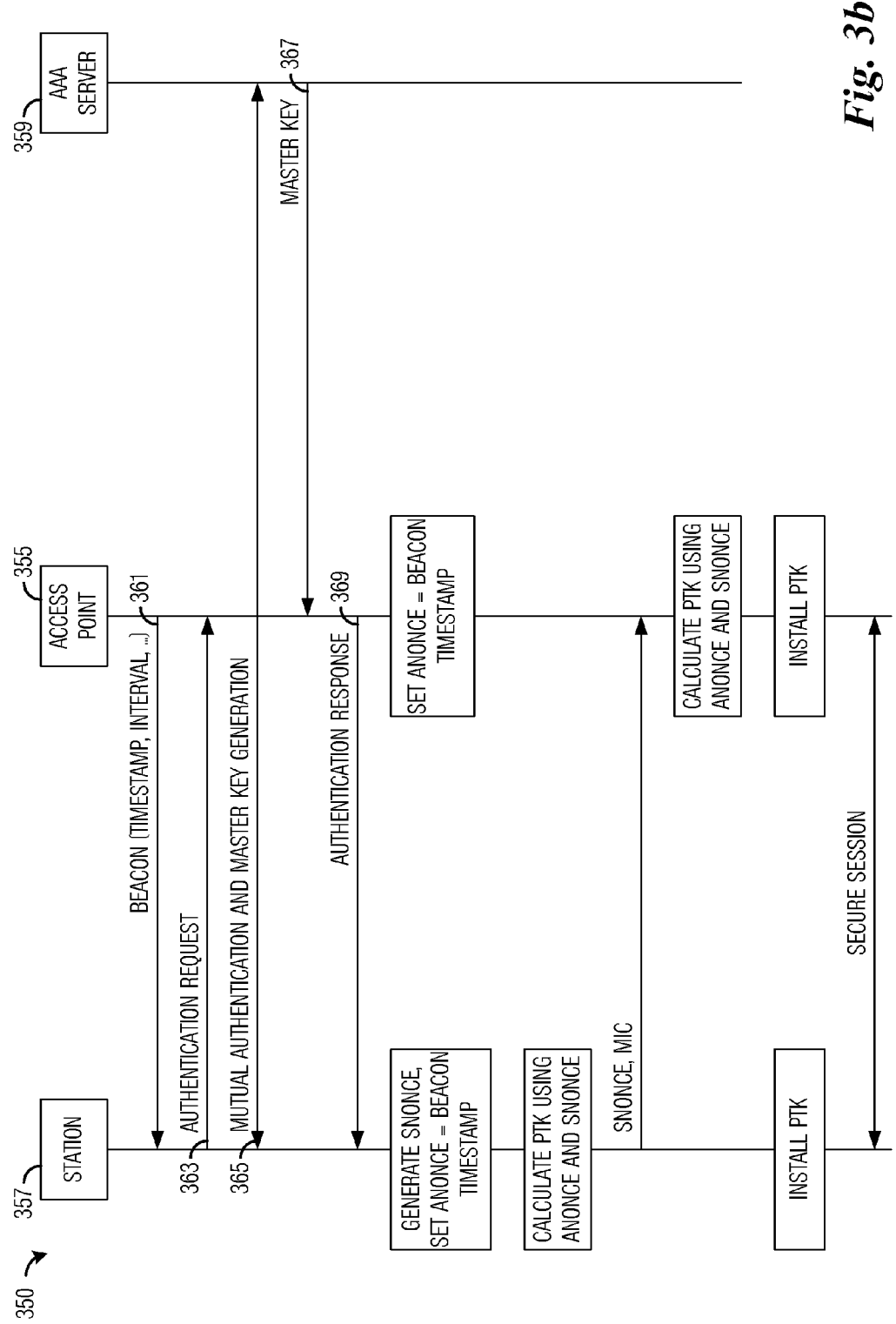
FIG. 3b illustrates an example message exchange diagram between two devices as the two devices establish a secure connection where a unique value of a system management message, e.g., a beacon, is used as a nonce, with example messages involved in a station attempting to establish a secure session highlighted according to example embodiments described herein.

FIG. 3b illustrates a message exchange diagram 350 between two devices as the two devices establish a secure connection where a unique value of a system management message, e.g., a beacon, is used as a nonce, with example messages involved in a station attempting to establish a secure session highlighted. Message exchange diagram 350 may involve messages exchanged between three devices, an access point 355, a station 357, and an authentication device, such as an authentication, authorization, and accounting (AAA) server 359, as access point 355 and station 357 establish a secure connection.

Message exchange diagram 350 may begin with access point 355 transmitting a beacon (shown as event 361). Station 357 may attempt to establish a secure session with access point 355. As shown in FIG. 3b, the establishment of the secure session may include station 357 transmitting an authentication request to access point 355 (shown as event 363), station 357 and AAA server 359 performing mutual authentication and master key generation (shown as event 365), AAA server 359 transmitting a master key to access point 355 (shown as event 367), and access point 355 transmitting an authentication response to station 357 (shown as event 369). It is noted that a remainder of message exchange diagram 350 may be similar to message exchange diagram 300 and will not be described in detail herein.

Figure 3C:
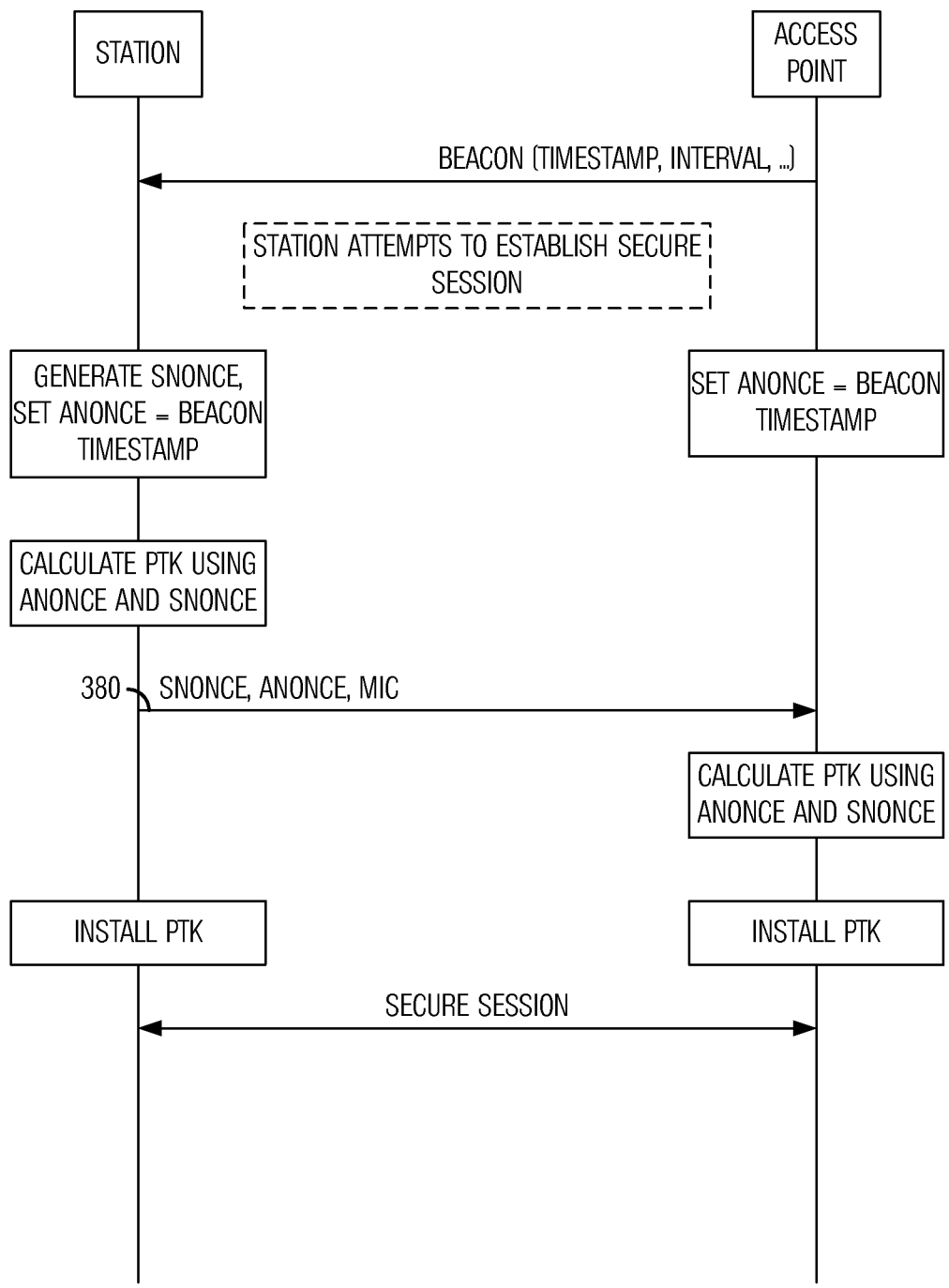
FIG. 3c illustrates a second example message exchange diagram between two devices as the two devices establish a secure connection where a unique value of a system management message is used as a nonce according to example embodiments described herein.

FIG. 3c illustrates a message exchange diagram 375 between two devices as the two devices establish a secure connection where a unique value of a system management message is used as a nonce. Message exchange diagram 375 may involve messages exchanged between two devices, an access point and a station, as the access point and the station establish a secure connection where a unique value of a system management message, e.g., a beacon, is used as a nonce.

It is noted that message exchange diagram 375 may be similar to message exchange diagram 300 illustrated in FIG. 3a. However, rather than station 307 transmitting its SNONCE and its integrity code, e.g., its MIC (shown as event 320 of FIG. 3a), the station may transmit its NONCE, the ANONCE, and its integrity code to the access point (shown as event 380). As an example, the station may transmit the timestamp of the communications system management message in its entirety to the access point so that the access point may check which timestamp or nonce has been used by the station during the session key generation process. As another example, the station may transmit a portion of the timestamp of the communications system management message to the access point so that the access point may check which timestamp or nonce has been used by the station during the session key generation process. As another example, the station may transmit the timestamp or a portion of the timestamp of the communications system management message after having a mathematical function applied to it to the access point.

Figure 4:
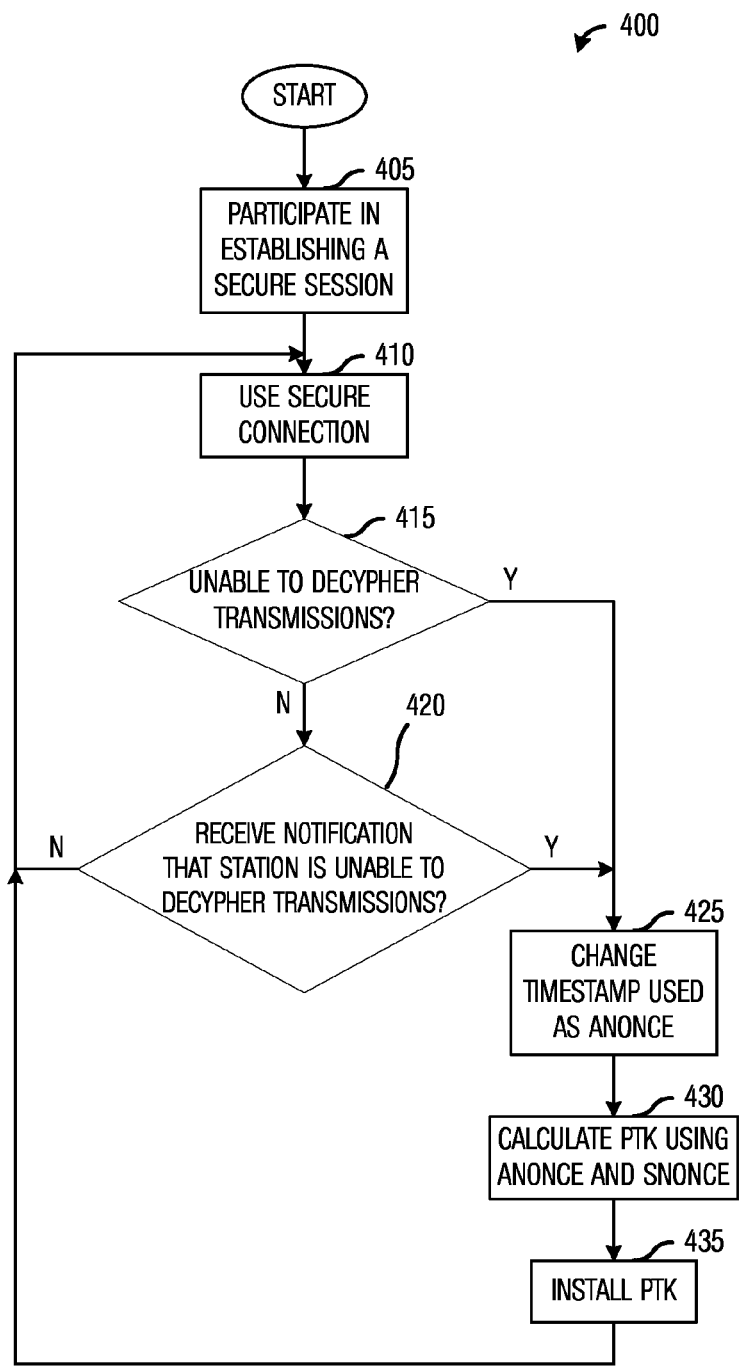
FIG. 4 illustrates an example flow diagram of operations in an access point participating in secure communications with a station, where the access point may change a timestamp of a communications system management message, e.g., a beacon, used as a nonce according to example embodiments described herein.

FIG. 4 illustrates a flow diagram of operations 400 in an access point participating in secure communications with a station, where the access point may change a timestamp of a communications system management message, e.g., a beacon, used as a nonce. Operations 400 may be indicative of operation occurring in an access point, such as access point 305 and access point 355, as the access point participates in secure communications with a station, such as station 307 and station 357.

Operations 400 may begin with the access point participating in establishing a secure session with the station where a unique value in a communications system management message is used as a nonce (block 405). Examples of establishing the secure session may be found in the description of FIGS. 3a and 3b. The access point and the station may then use the secure connection to communicate in the secure session (block 410).

The access point may then perform several checks to determine if the access point and/or the station are using the correct security keys in the secure session. The access point may check to determine if it is able to decipher transmissions from the station (block 415). Since the access point is performing the deciphering of the transmissions from the station, the access point may have immediate knowledge if it is able to decipher the transmissions of the station. The access point may also check to determine if the station is able to decipher transmissions from the access point (block 420). As an example, the access point may receive a transmission from the station indicating that the station is unable to decipher the transmissions of the access point. The transmission from the station may be transmitted over an unsecured connection, but potentially with an integrity code to ensure the access point that the message was sent by the station.

If the access point is able to decipher the transmissions of the station and the station is able to decipher the transmissions of the access point, then the access point may return to block 410 to continue communications with the station over the secure connection.

If the access point is not able to decipher the transmissions of the station and/or the station is not able to decipher the transmissions of the access point, then the access point may change the timestamp of a communications system management message used as the nonce, e.g., the ANONCE (block 425). As an example, if beacon A is the most recent beacon transmitted by the access point and the timestamp of beacon A is used as the ANONCE, then the access point may use a timestamp of beacon B, where beacon B was transmitted prior to beacon A, as the ANONCE. It is noted that beacon B may be the beacon transmitted immediately prior to the transmission of beacon A. It is noted that beacon B may be a beacon transmitted prior to the transmission of beacon A, with one or more beacons transmitted between the transmission of beacon A and beacon B.

The access point may use the timestamp of beacon B as the ANONCE and calculate a security key from the ANONCE and the SNONCE sent by the station (block 430) and the access point may then install the security key (block 435). The access point may return to block 410 to communicate with the station over the secure connection. It is noted that the access point may have to change the timestamp a plurality of times before it finds the proper timestamp for the ANONCE.

Figure 5:
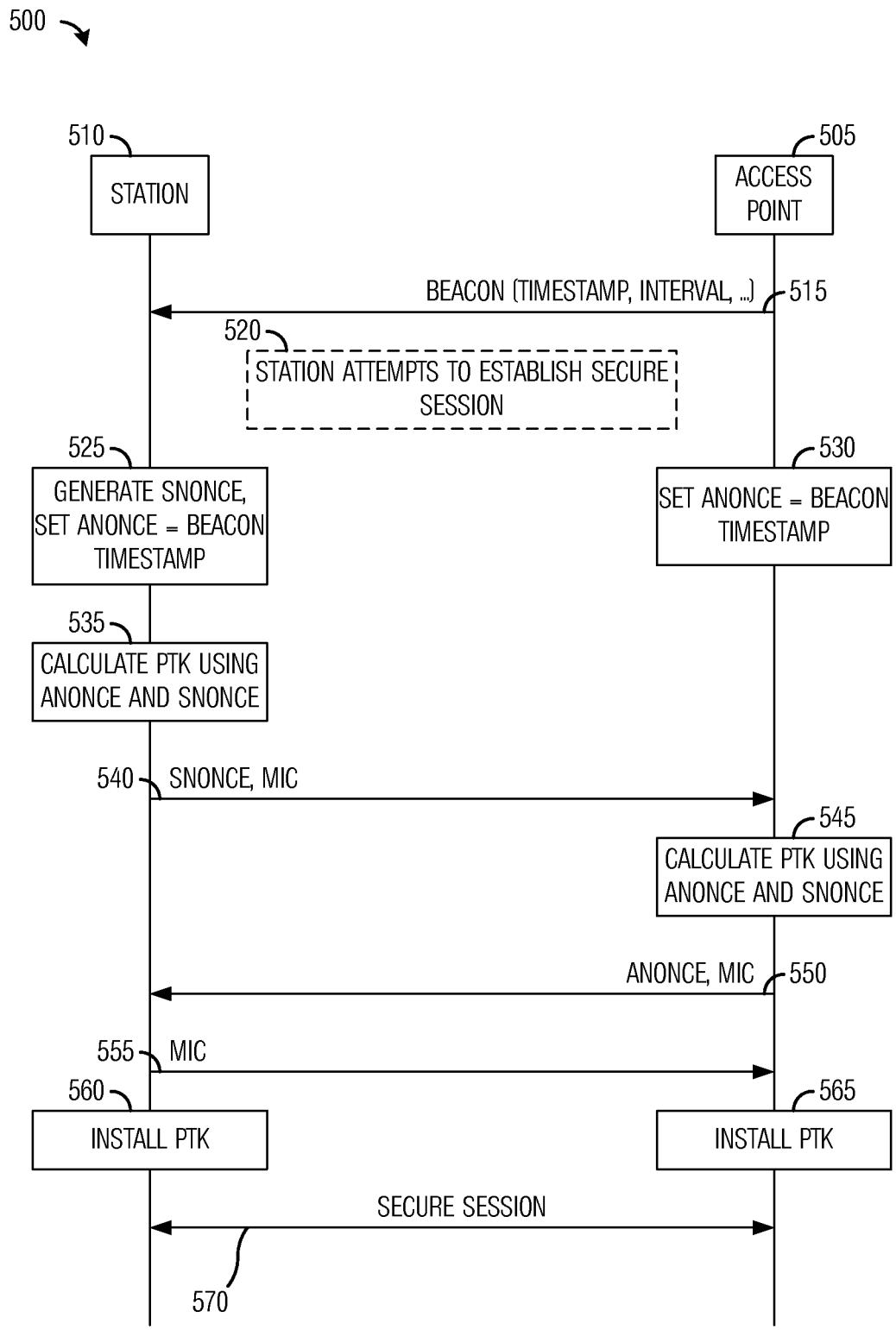
FIG. 5 illustrates an example message exchange diagram between two devices as the two devices establish a secure connection where a unique value of a system management message is used as a nonce according to example embodiments described herein.

FIG. 5 illustrates a message exchange diagram 500 between two devices as the two devices establish a secure connection where a unique value of a system management message is used as a nonce. Message exchange diagram 500 may involve messages exchanged between two devices, an access point 505 and a station 510, as access point 505 and station 510 establish a secure connection.

Message exchange diagram 500 may begin with access point 505 transmitting a beacon (shown as event 515). As an example, in a Wi-Fi communications system, a beacon is transmitted by an access point, such as access point 505, with a period of approximately 100 milliseconds. A Wi-Fi beacon generally includes a timestamp that indicates when the access point transmitted the beacon, as well as an interval, which may specify when the next beacon will be transmitted. It is noted that the timestamp may be an automatically generated unique value and may be used as a nonce, such as an ANONCE.

Station 510 may attempt to establish a secure session with access point 505 (shown as event 520). As an example, the messages exchanged in establishing the connection may include a connection request message sent by station 510 to access point 505, and a connection request response message sent by access point 505 to station 510.

As described previously, the timestamp of the beacon is a unique value, therefore, the timestamp may be used as a nonce, such as the ANONCE. Station 510 may generate a SNONCE and use the timestamp of the beacon as an ANONCE (shown as block 525). Similarly, access point 505 may use the timestamp of the beacon as the ANONCE (shown as block 530). Station 510 may use the ANONCE (from the timestamp of the beacon) and its own SNONCE to generate a security key, such as a PTK (shown as block 535). Station 510 may transmit its SNONCE and an integrity code, such as a MIC, to access point 505 (shown as event 540). As an example, the integrity code may be used by access point 505 to verify that the SNONCE is indeed transmitted by station 510.

Access point 505 may use its ANONCE and the SNONCE from station 510 to generate a security key, such as a PTK (shown as block 545). Access point 505 may send its ANONCE and an integrity code, such as a MIC, to station 510 (shown as even 550). It is noted that the integrity code sent by access point 505 may be different from the integrity code sent by station 510. As with the integrity code sent by station 510, the integrity code sent by access point 505 may be used to verify that the ANONCE is indeed transmitted by access point 505. Station 510 may transmit its integrity code to access point 505 to confirm that it successfully received the ANONCE and the integrity code from access point 505 (shown as event 555). It is noted that events 550 and 555 may be considered to be security information confirmation operations.

Both access point 505 and station 510 may then install the security keys, such as the PTKs, to secure the connection previously established (shown as blocks 560 and 565). Access point 505 and station 510 may now have a secure connection and may start the secure session (shown as event 570).

Figures 6, 7:
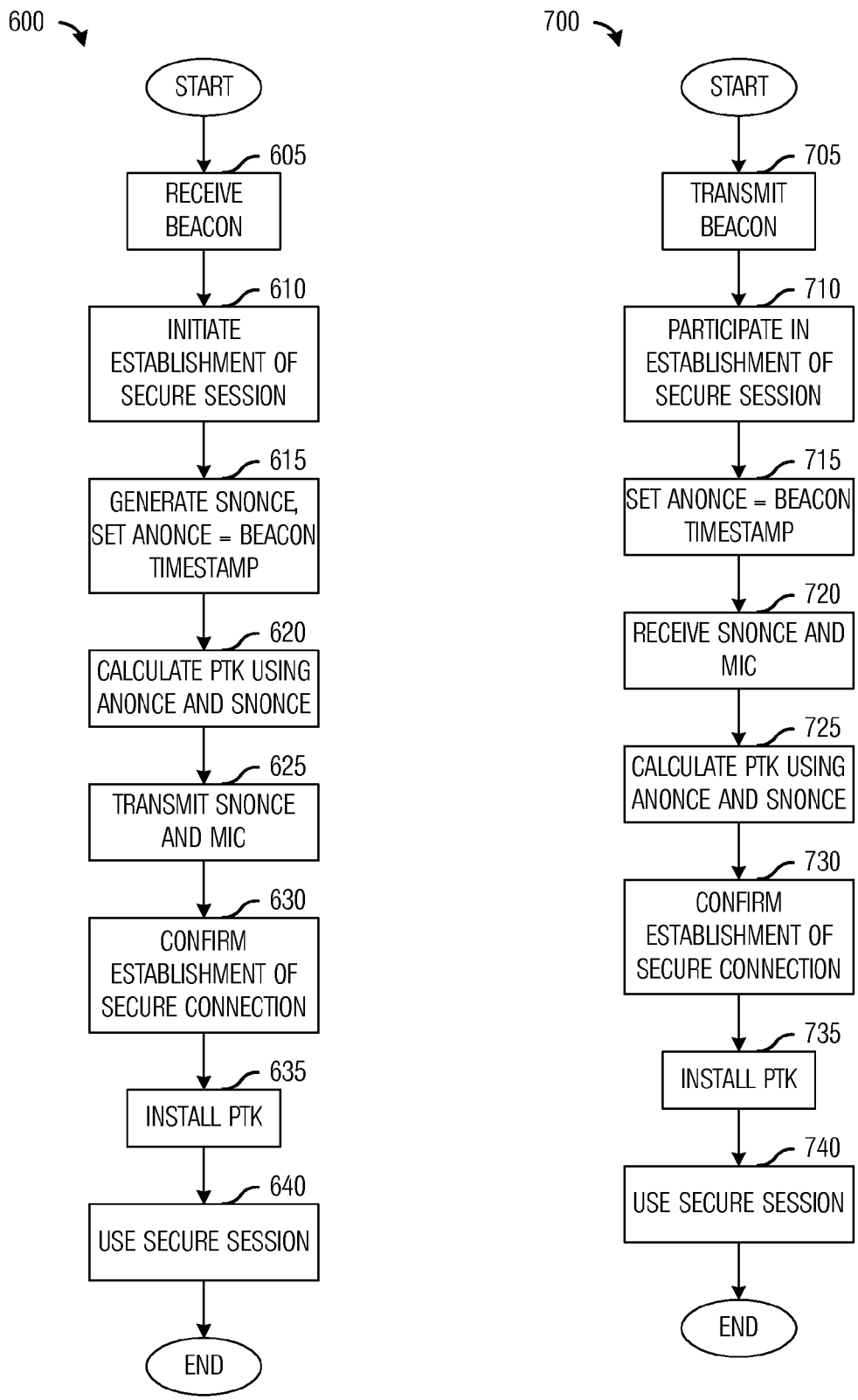
FIG. 6 illustrates an example flow diagram of operations in a station as the station participates in secure communications with an access point, where a timestamp of a communications system management message, e.g., a beacon, is used as a nonce according to example embodiments described herein.
FIG. 7 illustrates an example flow diagram of operations in an access point as the access point participates in secure communications with a station, where a timestamp of a communications system management message, e.g., a beacon, is used as a nonce according to example embodiments described herein.

FIG. 6 illustrates a flow diagram of operations 600 in a station as the station participates in secure communications with an access point, where a timestamp of a communications system management message, e.g., a beacon, is used as a nonce. Operations 600 may be indicative of operations occurring in a station, such as station 307, station 357, and station 510, as the station participates in secure communications with an access point, where a timestamp of a communications system management message, e.g., a beacon, is used as a nonce.

Operations 600 may begin with the station receiving a communications system management message, e.g., a beacon, transmitted by the access point (block 605). In general, the access point periodically transmits beacons. As an example, in a Wi-Fi compliant communications system, the access point may transmit a beacon once every 100 milliseconds. However, other periodicities may be possible.

The station may initiate an establishment of a secure session (block 610). As discussed previously, the establishment of the secure session may involve authentication of the station, as well as establishing a connection between the station and the access point. The station may also generate its own SNONCE and may use a timestamp of the beacon as an ANONCE (block 615). It is noted that the station may use the entirety of the timestamp as the ANONCE. However, it may be possible for the station to use a portion of the timestamp as the ANONCE. Additionally, the timestamp may be applied to a mathematical function before being used as the ANONCE. Examples of mathematical functions may include logarithms, roots, exponentials, linear functions, non-linear functions, and the like.

The station may use its SNONCE and the ANONCE from the beacon to generate a security key, such as a PTK (block 620). The station may transmit its SNONCE and an integrity code to the access point (block 625). As discussed previously, the integrity code, such as a message integrity code, may be used by a recipient of the transmission to verify the SNONCE and that the security keys are generated correctly. As another example, the station may transmit its SNONCE, the ANONCE, and its integrity code to the access point. The station may also confirm the establishment of the secure connection (block 630). The station may install the security key (block 635) and then use the secure session to transmit information to the access point as well as receive information from the access point (block 640).

FIG. 7 illustrates a flow diagram of operations 700 in an access point as the access point participates in secure communications with a station, where a timestamp of a communications system management message, e.g., a beacon, is used as a nonce. Operations 700 may be indicative of operations occurring in an access point, such as access point 305, access point 355, and access point 505, as the access point participates in secure communications with a station, where a timestamp of a communications system management message, e.g., a beacon, is used as a nonce.

Operations 700 may begin with the access point transmitting a communications system management message, e.g., a beacon (block 705). In general, the access point periodically transmits a beacon. As an example, in a Wi-Fi compliant communications system, the access point may transmit a beacon once every 100 milliseconds. However, other periodicities may be possible.

The access point may participate in an establishment of a secure session (block 710). As discussed previously, the establishment of the secure session may involve authentication of the station, as well as establishing a connection between the station and the access point. The access point may use a timestamp of its most recently transmitted beacon as its ANONCE (block 715). It is noted that the access point may use the entirety of the timestamp as the ANONCE. However, it may be possible for the access point to use a portion of the timestamp as the ANONCE. Additionally, the timestamp may be applied to a mathematical function before being used as the ANONCE. Examples of mathematical functions may include logarithms, roots, exponentials, linear functions, non-linear functions, and the like.

The access point may receive an SNONCE from the station, as well as an integrity code, such as a MIC (block 720). The integrity code may be used to verify the SNONCE and that the security keys are generated correctly. The access point may use its ANONCE and the SNONCE from the station to generate a security key, such as a PTK (block 725). The access point may also confirm the establishment of the secure connection (block 730). The access point may install the security key (block 735) and then use the secure session to transmit information to the station as well as receive information from the station (block 740).

Figure 8A:
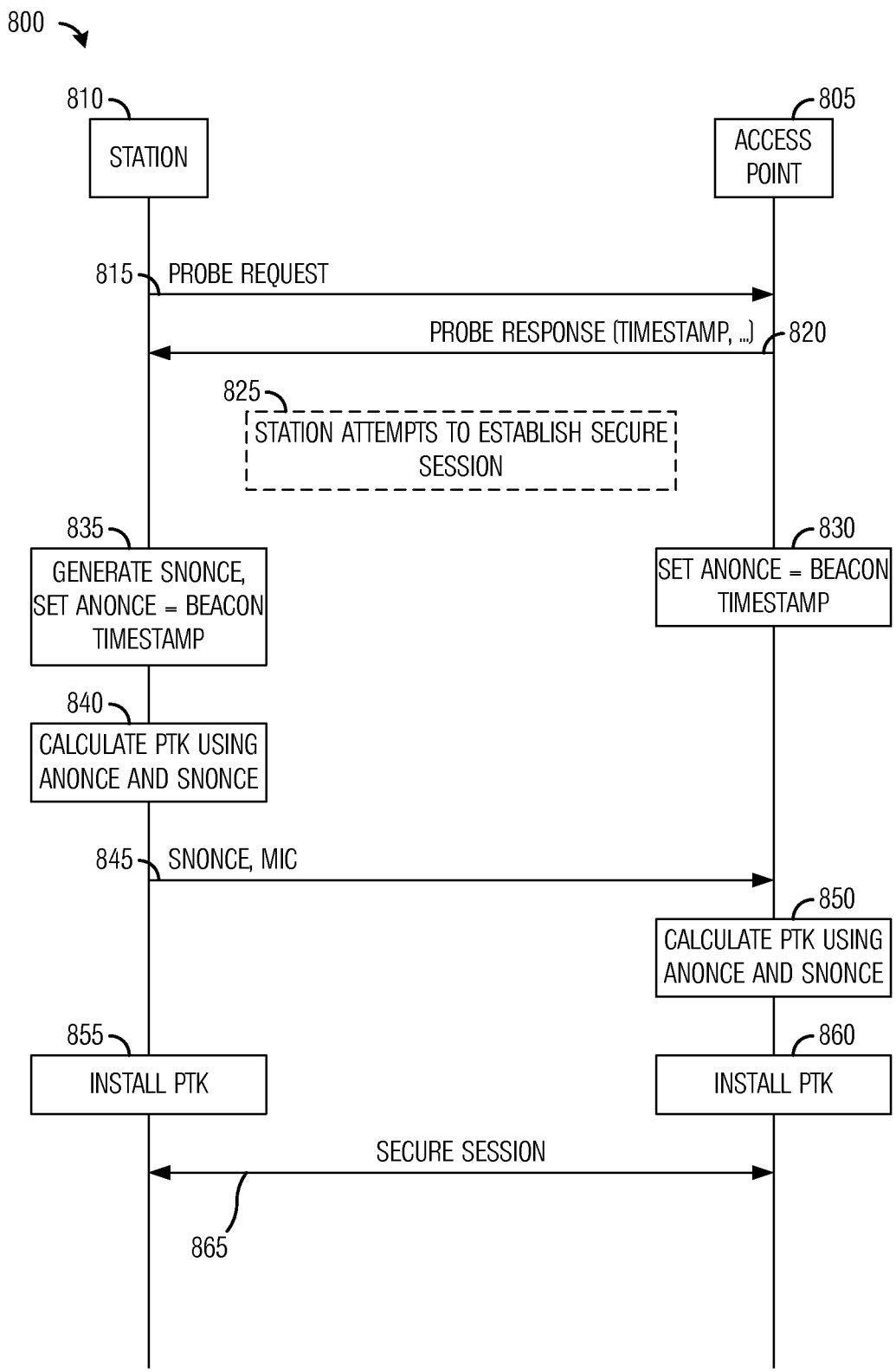
FIG. 8a illustrates a first example message exchange diagram between two devices as the two devices establish a secure connection where a unique value of a system management message, e.g., a probe response, is used as a nonce according to example embodiments described herein.

FIG. 8a illustrates a message exchange diagram 800 between two devices as the two devices establish a secure connection where a unique value of a system management message, e.g., a probe response, is used as a nonce. In general, probe request and probe response message pair may be used in place of a beacon when a station does not wish to wait for the beacon that is transmitted during the next beacon transmission interval. As an example, in an emergency situation where the station may need to establish a secure session as quickly as possible, if a beacon transmission interval set by the access point is too infrequent, the station may have no way of knowing in advance the beacon transmission interval. The station may initiate the establishing of the secure connection by sending a probe request message. Message exchange diagram 800 may involve messages exchanged between two devices, an access point 805 and a station 810, as access point 805 and station 810 establish a secure connection where a unique value of a system management message is used as a nonce.

Message exchange diagram 800 may begin with station 810 transmitting a probe request to access point 805 (shown as event 815). A probe request may be a message sent by station 810 to request information from access point 805 or another access point. As an example, the probe request may inquire about data rates supported by access point 805. Access point 805 may place its current time to a timestamp field of a probe response that it sends to station 810 and transmits the probe response to station 810 (shown as event 820).

Station 810 may attempt to establish a secure session with access point 805 (shown as event 825). As an example, the messages exchanged in establishing the secure session may include messages involved in authenticating station 810. As another example, the messages exchanged in establishing the secure session may include a connection request message sent by station 810 to access point 805, and a connection request response message sent by access point 805 to station 810.

Access Point 805 may use a timestamp of its most recently transmitted probe response as its ANONCE, e.g., contained in the timestamp field of the probe response (shown as block 830). As described previously, the timestamp of the probe response is a unique value, therefore, the timestamp of the beacon may be used as a nonce, such as the ANONCE. Station 810 may generate a SNONCE and use the timestamp of the probe response as an ANONCE (shown as block 835). Station 810 may use the ANONCE (from the timestamp of the probe response) and its own SNONCE to generate a security key, such as a PTK (shown as block 840). It is noted that station 810 may use the entirety of the timestamp as the ANONCE. However, it may be possible for station 810 to use a portion of the timestamp as the ANONCE. As an example, station 307 may use the N least significant bits of the timestamp, where N is a positive integer value. Additionally, the timestamp may be applied to a mathematical function before being used as the ANONCE. Examples of mathematical functions may include logarithms, roots, exponentials, linear functions, non-linear functions, and the like.

Station 810 may transmit its SNONCE and an integrity code, such as a MIC, to access point 805 (shown as event 845). As an example, the integrity code may be used by access point 805 to verify that the SNONCE is indeed transmitted by station 810.

Access point 805 may use its ANONCE and the SNONCE from station 810 to generate a security key, such as a PTK (shown as block 850). Both access point 805 and station 810 may then install the security keys, such as the PTKs, to secure the connection previously established (shown as blocks 855 and 860). Access point 805 and station 810 may now have a secure connection and may start the secure session (shown as event 865).

Figure 8B:
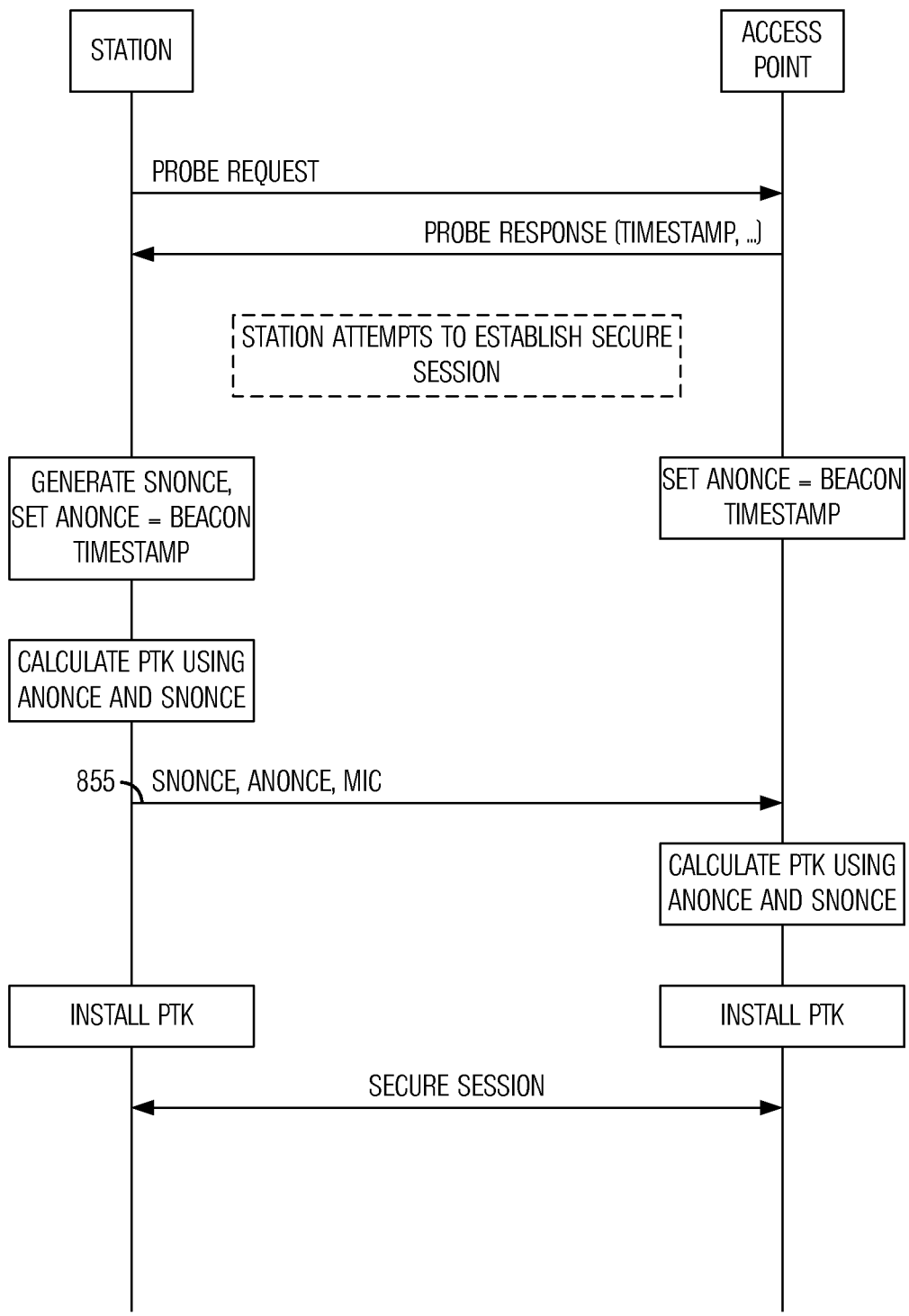
FIG. 8b illustrates a second example message exchange diagram between two devices as the two devices establish a secure connection where a unique value of a system management message, e.g., a probe response, is used as a nonce according to example embodiments described herein.

FIG. 8b illustrates a message exchange diagram 850 between two devices as the two devices establish a secure connection where a unique value of a system management message, e.g., a probe response, is used as a nonce. Message exchange diagram 850 may involve messages exchanged between two devices, an access point and a station, as the access point and the station establish a secure connection where a unique value of a system management message, e.g., a probe response, is used as a nonce.

It is noted that message exchange diagram 850 may be similar to message exchange diagram 800 illustrated in FIG. 8a. However, rather than station 810 transmitting its SNONCE and its integrity code, e.g., its MIC (shown as event 845 of FIG. 8a), the station may transmit its NONCE, the ANONCE, and its integrity code to the access point (shown as event 855). As an example, the station may transmit the timestamp of the communications system management message in its entirety to the access point so that the access point may check which timestamp or nonce has been used by the station during the session key generation process. As another example, the station may transmit a portion of the timestamp of the communications system management message to the access point. As another example, the station may transmit the timestamp or a portion of the timestamp of the communications system management message after having a mathematical function applied to it to the access point.

Figures 9, 10:
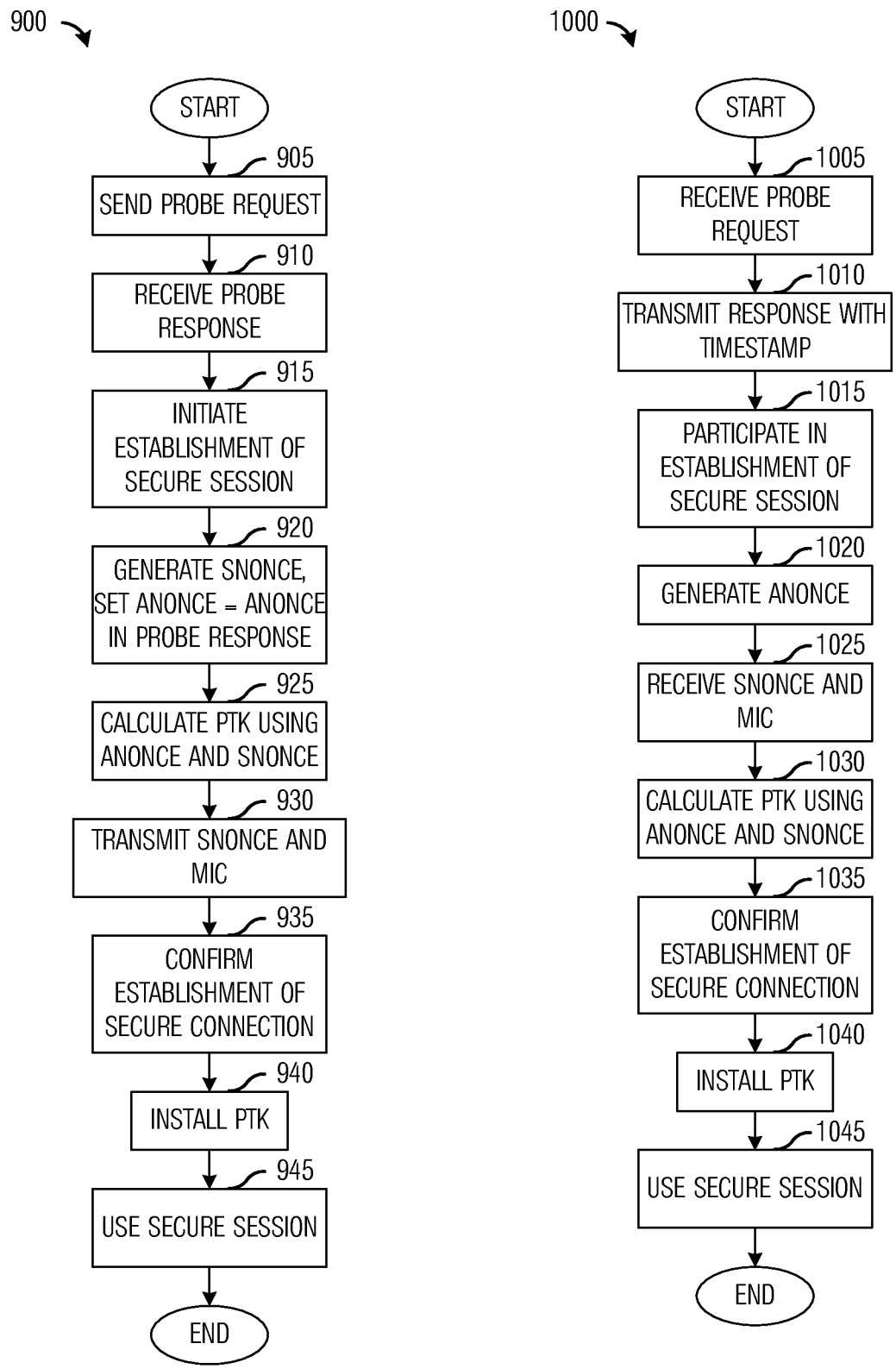
FIG. 9 illustrates an example flow diagram of operations in a station as the station participates in secure communications with an access point, where a timestamp of a communications system management message, e.g., a probe response, is used as a nonce according to example embodiments described herein.
FIG. 10 illustrates an example flow diagram of operations in an access point as the access point participates in secure communications with a station, where a timestamp of a communications system management message, e.g., a probe response, is used as a nonce according to example embodiments described herein.

FIG. 9 illustrates a flow diagram of operations 900 in a station as the station participates in secure communications with an access point, where a timestamp of a communications system management message, e.g., a probe response, is used as a nonce. Operations 900 may be indicative of operations occurring in a station, such as station 307, station 357, and station 510, as the station participates in secure communications with an access point, where a timestamp of a communications system management message, e.g., a probe response, is used as a nonce.

Operations 900 may begin with the station sending a probe request to an access point (block 905). As discussed previously, the probe request may request information, such as a supported data rate, from the access point. The station may receive a probe response (an example of a communications system management message) from the access point (block 910).

The station may initiate an establishment of a secure session (block 915). As discussed previously, the establishment of the secure session may involve authentication of the station, as well as establishing a connection between the station and the access point. The station may also generate its own SNONCE and may use a timestamp of the probe response as an ANONCE (block 920). It is noted that the station may use the entirety of the timestamp as the ANONCE. However, it may be possible for the station to use a portion of the timestamp as the ANONCE. Additionally, the timestamp may be applied to a mathematical function before being used as the ANONCE. Examples of mathematical functions may include logarithms, roots, exponentials, linear functions, non-linear functions, and the like.

The station may use its SNONCE and the ANONCE from the beacon to generate a security key, such as a PTK (block 925). The station may transmit its SNONCE and an integrity code to the access point (block 930). As discussed previously, the integrity code, such as a message integrity code, may be used by a recipient of the transmission to verify the SNONCE and that the security keys are generated correctly. As another example, the station may transmit its SNONCE, the ANONCE, and the integrity code to the access point. The station may also confirm the establishment of the secure connection (block 935). The station may install the security key (block 940) and then use the secure session to transmit information to the access point as well as receive information from the access point (block 945).

FIG. 10 illustrates a flow diagram of operations 1000 in an access point as the access point participates in secure communications with a station, where a timestamp of a communications system management message, e.g., a probe response, is used as a nonce. Operations 1000 may be indicative of operations occurring in an access point, such as access point 305, access point 355, and access point 505, as the access point participates in secure communications with a station, where a timestamp of a communications system management message, e.g., a probe response, is used as a nonce.

Operations 1000 may begin with the access point receiving a probe request from the station (block 1005). In general, the probe request may request information from the access point, such as a supported data rate. The access point may set a timestamp field of a probe response and transmits the probe response (an example of a communications system management message) to the station (block 1010).

The access point may participate in an establishment of a secure session (block 1015). As discussed previously, the establishment of the secure session may involve authentication of the station, as well as establishing a connection between the station and the access point.

The access point may set a timestamp of a probe response that it transmits to the station as its ANONCE (block 1020). It is noted that the access point may use the entirety of the timestamp as the ANONCE. However, it may be possible for the access point to use a portion of the timestamp as the ANONCE. Additionally, the timestamp may be applied to a mathematical function before being used as the ANONCE. Examples of mathematical functions may include logarithms, roots, exponentials, linear functions, non-linear functions, and the like. The access point may receive an SNONCE from the station, as well as an integrity code, such as a MIC (block 1025). The integrity code may be used to verify the SNONCE and that the security keys are generated correctly. The access point may use its ANONCE and the SNONCE from the station to generate a security key, such as a PTK (block 1030).

The access point may also confirm the establishment of the secure connection (block 1035). The access point may install the security key (block 1040) and then use the secure session to transmit information to the station as well as receive information from the station (block 1045).

Figure 11:
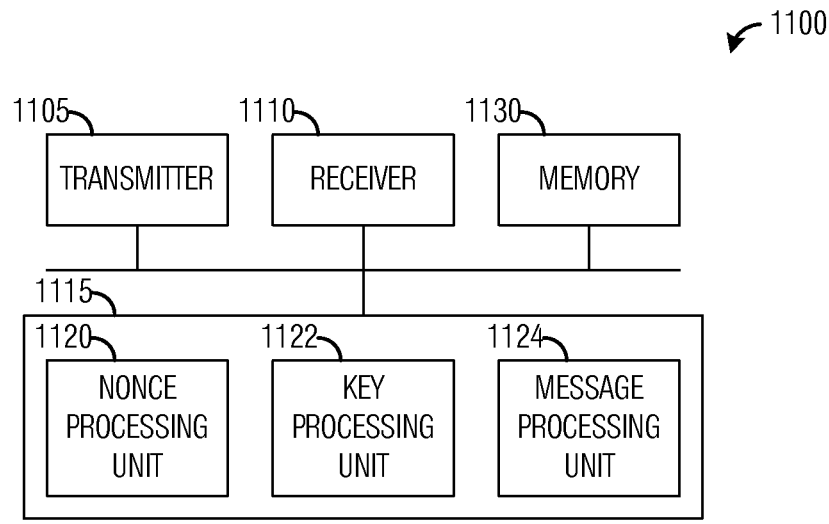
FIG. 11 illustrates an example diagram of a first communications device according to example embodiments described herein.

FIG. 11 illustrates a diagram of a first communications device 1100. Communications device 1100 may be an implementation of an access point of a communications system. Communications device 1100 may be used to implement various ones of the embodiments discussed herein. As shown in FIG. 11, a transmitter 1105 is configured to send messages, information, communications system management messages, beacons, probe responses, and the like, and a receiver 1110 is configured to receive messages, information, and the like. Transmitter 1105 and receiver 1110 may have a wireless interface, a wireline interface, or a combination thereof.

A nonce processing unit 1120 is configured to generate a nonce, such as an ANONCE. Nonce processing unit 1120 is configured to generate a unique value for the nonce or to use a value, such as a timestamp of a communications system management message as the nonce. Nonce processing unit 1120 is configured to use the timestamp in its entirety or a portion of the timestamp as the nonce. Nonce processing unit 1120 is configured to apply a mathematical function, such as logarithms, roots, exponentials, linear functions, non-linear functions, and the like, to the timestamp or portion thereof, prior to using it as the nonce. A key processing unit 1122 is configured to generate a security key according to an ANONCE and a SNONCE. A message processing unit 1124 is configured to process communications system management messages, such as beacons and probe responses. Message processing unit 1124 is configured to generate communications system management messages. Message processing unit 1124 is configured to process messages and requests received from other communications devices. A memory 1130 is configured to store timestamps, nonces, communications system management messages, messages, requests, and the like.

The elements of communications device 1100 may be implemented as specific hardware logic blocks. In an alternative, the elements of communications device 1100 may be implemented as software executing in a processor, controller, application specific integrated circuit, or so on. In yet another alternative, the elements of communications device 1100 may be implemented as a combination of software and/or hardware.

As an example, transmitter 1105 and receiver 1110 may be implemented as a specific hardware block, while nonce processing unit 1120, key processing unit 1122, and message processing unit 1124 may be software modules executing in a processor 1115, such as a microprocessor, a digital signal processor, a custom circuit, or a custom compiled logic array of a field programmable logic array.

Figure 12:
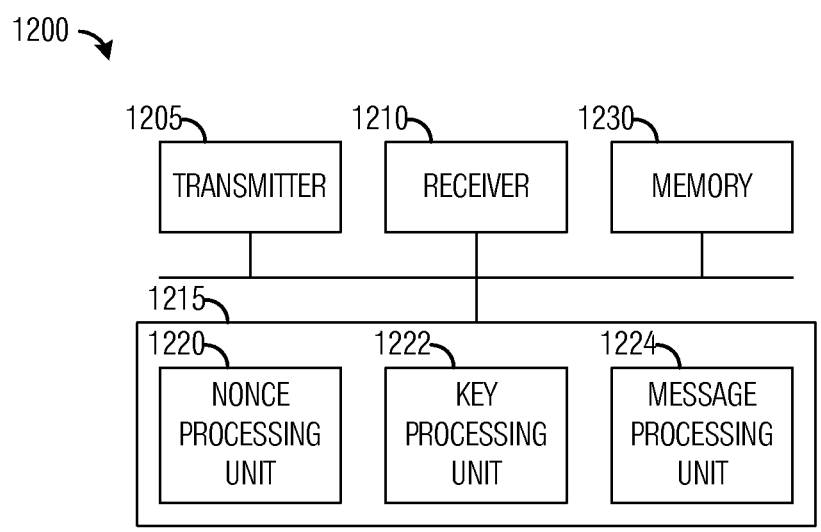
FIG. 12 illustrates an example diagram of a second communications device according to example embodiments described herein.

FIG. 12 illustrates a diagram of a first communications device 1200. Communications device 1200 may be an implementation of station of a communications system. Communications device 1200 may be used to implement various ones of the embodiments discussed herein. As shown in FIG. 12, a transmitter 1205 is configured to send messages, requests, probe requests, and the like, and a receiver 1210 is configured to receive messages, information, communications system management messages, beacons, probe responses, and the like. Transmitter 1205 and receiver 1210 may have a wireless interface, a wireline interface, or a combination thereof.

A nonce processing unit 1220 is configured to generate a nonce, such as a SNONCE. Nonce processing unit 1220 is configured to generate a unique value for the nonce or to use a value, such as a timestamp of a communications system management messages the nonce. Nonce processing unit 1220 is configured to use the timestamp in its entirety or a portion of the timestamp as the nonce. Nonce processing unit 1220 is configured to apply a mathematical function, such as logarithms, roots, exponentials, linear functions, non-linear functions, and the like, to the timestamp or portion thereof, prior to using it as the nonce. A key processing unit 1222 is configured to generate a security key according to an ANONCE and a SNONCE. A message processing unit 1224 is configured to process communications system management messages, such as beacons and probe responses. Message processing unit 1224 is configured to generate messages and requests. Message processing unit 1224 is configured to process messages and requests received from other communications devices. A memory 1230 is configured to store timestamps, nonces, communications system management messages, messages, and the like.

The elements of communications device 1200 may be implemented as specific hardware logic blocks. In an alternative, the elements of communications device 1200 may be implemented as software executing in a processor, controller, application specific integrated circuit, or so on. In yet another alternative, the elements of communications device 1200 may be implemented as a combination of software and/or hardware.

As an example, transmitter 1205 and receiver 1210 may be implemented as a specific hardware block, while nonce processing unit 1220, key processing unit 1222, and message processing unit 1224 may be software modules executing in a processor 1215, such as a microprocessor, a digital signal processor, a custom circuit, or a custom compiled logic array of a field programmable logic array.

Although the present disclosure and its advantages have been described in detail, it should be understood that various changes, substitutions and alterations can be made herein without departing from the spirit and scope of the disclosure as defined by the appended claims.

What is claimed is:

1. A method for establishing a secure connection between a station and an access point in a wireless system, the method comprising:
transmitting, by the access point, a beacon or probe response to the station, the beacon or probe response including a system time used by the access point for the wireless system, wherein an access point nonce is the system time of the beacon or probe response, respectively;
receiving, by the access point, a station nonce from the station;
determining, by the access point, a first security key according to the access point nonce and the station nonce; and
securing, by the access point, a connection between the station and the access point using the first security key.

2. The method of claim 1, wherein the transmitting by the access point transmits the beacon.

3. The method of claim 1, wherein the transmitting by the access point transmits the probe response.

4. The method of claim 3, further comprising, prior to the transmitting the probe response, receiving a probe request from the station.

5. The method of claim 1, further comprising receiving a first integrity code for the station nonce.

6. The method of claim 1, further comprising confirming security information.

7. The method of claim 6, wherein confirming the security information comprises:
transmitting the access point nonce and a first integrity code to the station; and
receiving a second integrity code from the station.

8. The method of claim 1, wherein securing the connection comprises installing the first security key.

9. The method of claim 1, further comprising:
determining that a secured transmission on the secured connection is undecipherable;
changing the access point nonce;
determining a second security key based on the changed access point nonce and the station nonce; and
securing the connection between the station and the access point using the second security key.

10. A method for establishing a secure connection between a station and an access point in a wireless system, the method comprising:
receiving, by the station, a beacon or probe response from the access point, the beacon or probe response including a system time used by the access point for the wireless system, wherein an access point nonce is the system time of the beacon or probe response, respectively;
determining, by the station, a first security key according to the access point nonce and a station nonce;
transmitting, by the station, the station nonce to the access point; and
securing, by the station, a connection between the station and the access point using the first security key.

11. The method of claim 10 wherein the receiving by the station receives the beacon.

12. The method of claim 10, wherein the receiving by the station receives the probe response.

13. The method of claim 12, further comprising prior to receiving the probe response, transmitting a probe request to the access point.

14. The method of claim 10, further comprising transmitting a first integrity code for the station nonce to the access point.

15. The method of claim 10, further comprising:
receiving the access point nonce and a first integrity code from the access point; and
transmitting a second integrity code to the access point.

16. An access point in a wireless system comprising:
a transmitter configured to transmit a beacon or probe response to a station, the beacon or probe response including a system time used by the access point for the wireless system, wherein an access point nonce is the system time of the beacon or probe response, respectively;

a receiver configured to receive a station nonce from the station; and a processor operatively coupled to the transmitter and to the receiver, the processor configured to determine a first security key according to the access point nonce and the station nonce, and to secure a connection between the station and the access point using the first security key.

17. The access point of claim 16, wherein the beacon or probe response is the beacon.

18. The access point of claim 16, wherein the beacon or probe response is the probe response.

19. The access point of claim 16, wherein the transmitter is configured to transmit the access point nonce and a first integrity code to the station, and wherein the receiver is configured to receive a second integrity code.

20. The access point of claim 16, wherein the processor is configured to determine that a secured transmission on the secured connection is undecipherable, to change the access point nonce, to determine a second security key based on the changed access point nonce and the station nonce, and to secure the connection between the station and the access point using the second security key.

21. A station in a wireless system comprising:

a receiver configured to receive a beacon or probe response from an access point, the beacon or probe response including a system time used by the access point for the wireless system, wherein an access point nonce is the system time of the beacon or probe response, respectively;

a transmitter configured to transmit a station nonce to the access point; and a processor operatively coupled to the receiver and to the transmitter, the processor configured to determine a first security key according to the access point nonce and the station nonce, and to secure a connection between the station and the access point using the first security key.

22. The station of claim 21, wherein the beacon or probe response is the beacon.

23. The station of claim 21, wherein the beacon or probe response is the probe response.

24. The station of claim 21, wherein the receiver is configured to receive the access point nonce and a first integrity code from the access point, and wherein the transmitter is configured to transmit a second integrity code to the access point.

* * * * *